United States Patent
De La Riviere et al.

(10) Patent No.: US 10,341,163 B2
(45) Date of Patent: Jul. 2, 2019

(54) METHOD AND DEVICE TO ASSIST WITH DECISION-MAKING

(71) Applicant: IMMERSION, Bordeaux (FR)

(72) Inventors: Jean-Baptiste De La Riviere, Bordeaux (FR); Nicolas Biasiolo, Eysines (FR)

(73) Assignee: IMMERSION (FR)

( * ) Notice: Subject to any disclaimer, the term of this patent is extended or adjusted under 35 U.S.C. 154(b) by 0 days.

(21) Appl. No.: 15/516,222

(22) PCT Filed: Oct. 2, 2015

(86) PCT No.: PCT/EP2015/072808
§ 371 (c)(1),
(2) Date: Mar. 31, 2017

(87) PCT Pub. No.: WO2016/050960
PCT Pub. Date: Apr. 7, 2016

(65) Prior Publication Data
US 2017/0310532 A1    Oct. 26, 2017

(30) Foreign Application Priority Data

Oct. 2, 2014 (FR) .................................. 14 59449
Dec. 5, 2014 (FR) .................................. 14 61995

(51) Int. Cl.
*H04L 29/08* (2006.01)
*G06F 9/451* (2018.01)
(Continued)

(52) U.S. Cl.
CPC ............ *H04L 29/08* (2013.01); *G06F 3/1454* (2013.01); *G06F 3/1462* (2013.01); *G06F 9/451* (2018.02);
(Continued)

(58) Field of Classification Search
CPC .... G06Q 10/10; G06Q 30/0257; G06Q 10/06; G06Q 10/00; G06Q 10/063; G06Q 30/0269
(Continued)

(56) References Cited

U.S. PATENT DOCUMENTS 7,840,509 B1 * 11/2010 Messina ................ G06Q 50/10
706/45
2006/0106755 A1   5/2006   Stuhec
2016/0055238 A1   2/2016   Miyabe et al.

FOREIGN PATENT DOCUMENTS

WO    2007113573    10/2007
WO    2008103436    8/2008
(Continued)

OTHER PUBLICATIONS

Prakash, et al. "Distview: Support for Building Efficient Collaborative Applications using Replicated Objects." CSCW '94 Computer-Supported Coopertive Work 1994. Nov. 1994:151-161.
(Continued)

*Primary Examiner* — Keith Ferguson
(74) *Attorney, Agent, or Firm* — Perman & Green, LLP

(57) ABSTRACT

A method to assist with decision making, according to which a plurality of information sources, presumed to be useful for analyzing a situation, are recorded in a database of a device, including a digital processing system with display means and interface means in order to perform interactions on information containers and/or on contents of the information containers, presented to the operators in visual form by the display means. Every interaction of an operator with an information container is stored by the digital processing system and is interpreted so as to identify an operation on the corresponding information sources. The device establishes a list of information containers of the database that were not the subject of any interaction during the work session and
(Continued)

information sources of the database that were not the subject of any operation during the work session.

17 Claims, 2 Drawing Sheets

(51) Int. Cl.
    *G06F 16/28*     (2019.01)
    *G06Q 10/06*     (2012.01)
    *G06Q 10/10*     (2012.01)
    *G06F 3/14*     (2006.01)
    *G09G 5/14*     (2006.01)
    *G06F 3/0481*     (2013.01)
    *G06F 3/0484*     (2013.01)

(52) U.S. Cl.
    CPC .......... *G06F 16/284* (2019.01); *G06F 16/288* (2019.01); *G06Q 10/06* (2013.01); *G06Q 10/0633* (2013.01); *G06Q 10/10* (2013.01); *G06Q 10/101* (2013.01); *G06Q 10/103* (2013.01); *G09G 5/14* (2013.01); *H04L 67/1095* (2013.01); *H04L 67/22* (2013.01); *G06F 3/0481* (2013.01); *G06F 3/04842* (2013.01); *G06F 3/04845* (2013.01); *G06F 2203/04804* (2013.01); *H04L 67/10* (2013.01)

(58) Field of Classification Search
    USPC ............ 455/552.1, 550.1, 403, 422.1, 412.1, 455/412.2, 466, 426.1, 426.2; 715/255, 715/716, 751, 762; 706/12, 46
    See application file for complete search history.

(56) References Cited

FOREIGN PATENT DOCUMENTS

| | | |
|---|---|---|
| WO | 2013070930 | 5/2013 |
| WO | 2014141452 | 9/2014 |

OTHER PUBLICATIONS

International Search Report. International Application No. PCT/EP2015/072808, dated Dec. 3, 2015.

* cited by examiner

METHOD AND DEVICE TO ASSIST WITH DECISION-MAKING

CROSS-REFERENCE TO RELATED APPLICATIONS

This application is the National Stage of International Application No. PCT/EP2015/072808, having an International Filing Date of 2 Oct. 2015, which designated the United States of America, and which International Application was published under PCT Article 21(2) as WO 2016/050960 A1, and which claims priority from and the benefit of French Application No. 1459449, filed on 2 Oct. 2014 and French Application No. 1461995, filed 5 Dec. 2014, the disclosures of which are incorporated herein by reference in their entireties.

BACKGROUND

1. Field

The presently disclosed embodiment belongs to the field of information processing.

More particularly, the disclosed embodiment implements a device by which operators act on viewed information, and which, by processing the interactions between the information items and the operators, defines criteria on the use of the various information items so as to accompany a decision-making process.

2. Brief Description of Related Developments

In the field of the utilization of information by a human operator or a group of people, it is generally admitted that the information is consulted and classed according to more or less subjective criteria of an interest that each operator identifies in an item of information with respect to a problematic issue tackled.

Usually the item of information is placed on a scale of interest which leads the operators to consult the information, sort it, accord it a value score, annotate it, duplicate it, class it etc. and usually to produce summaries.

Today, operators are furnished with numerous computer means which allow them to carry out these operations with a certain performance, both for the display of the information and for the sharing of the information between several operators, as well as for keeping score.

However, with these procedures, it is difficult for operators to rapidly get an objective view of all the processed information, in particular as soon as the amount of information becomes considerable, in practice greater than a few tens of items.

It is furthermore tedious to simultaneously view information arising from various sources and which may arise in different forms and digital formats.

From the standpoint of hardware means, solutions such as the CLICKSHARE device from BARCO meet this limitation partially. In this device, all the computer terminals necessary for sharing the information pass via a set of additional boxes before being linked to a large-size display device, thus allowing several operators to display their information accessible in digital form side by side.

However, such a device is limited to displaying screenshots side by side and does not allow advanced manipulation or objective analysis of the use of the contents which are displayed there.

The operator or operators are left to themselves to ensure that the entirety of the information that they have judged potentially necessary before or in the course of thinking is actually utilized at the appropriate moment and in relation to other information which would be complementary.

To assist the other operators in the management and organization of the information and to preserve their contributions related to a thought, one or more operators can isolate, hierarchize, class and organize, in the form of graphs, the various elements (ideas, contents, questions etc.) that they see in connection with the thought contemplated.

Document WO2008103436 for example describes a system making it possible to synchronize the information in a conceptual chart with the information present in various related software packages.

Document WO2013070930 describes a method of collaborative conceptual chart editing and synchronization.

These procedures and devices exhibit, however, the drawback of producing subjective graphs which are constructed consciously, at least partially, by one or more operators, in parallel with discussions optionally conducted with other operators.

Numerous known procedures, like the methods described in WO2014141452 or US2014407959, rely on a thorough analysis of sets of documents to identify the existence or otherwise of a relationship between them.

However, these procedures implement means relying exclusively on the analysis of the contents of the documents, be they textual or graphical, and do not consider in any way the manner in which these contents are handled by the operator or operators by acting on the containers of these contents.

It emerges that such procedures and devices do not offer any analysis of the manner in which knowledge will have been utilized in the course of thinking.

SUMMARY

The presently disclosed embodiment affords a solution in which, without specific intervention of the operators, the information is identified which within the framework of the analysis of a set of information items has been used more or less to organize the information sources as a function of the interest which it was possible to ascribe to the information.

According to the method for aiding decision-making, a plurality of information sources, presupposed to be useful to the analysis of a situation having to form the subject of at least one decision, are referenced, for example recorded, in a database of a device, comprising a digital processing system with display means and interface means, by which device at least one operator carries out, in the course of a work session, interactions on information containers presented to the operator or to the operators in visual form by the display means.

Any interaction, detected by the interface means, of an operator with an information container is stored by the digital processing system and the stored interactions are interpreted so as to determine an index of interest of each of the information sources from which said information containers originate.

On a prompt of an operator or of the digital processing system, the device establishes a list of information containers of the database organized by values, or tranches of values, of the indices of interest determined for each of the information sources in the course of the work session.

Thus the operator or operators that work on the information are able to concentrate totally on the contents which hold their attention without being disturbed by the management of the set of information items and the device produces during a work session an objective log of the information organized as a function of the interactions, or of the absence of interaction, with the information containers corresponding to the information sources at the disposal of the operators.

In one mode of implementation, the list of the information containers of the database, organized by values, or tranches of values, of the interest indices determined for each of the information sources, determines a list of information containers of the database whose index of interest is below a predefined threshold value and/or one defined by an operator, said threshold value being chosen as criterion to specify that the corresponding information sources of the database have not formed the subject of any significant operation, that is to say of any significant interaction of the set of information containers of the information source considered, in the course of the work session.

An objective solution is thus afforded, allowing operators to become aware a posteriori either of forgetting to consider certain information or of concluding that this information lacks interest within the framework of the work carried out.

In one form of implementation, any modification of an information container, resulting from an interaction of an operator or an independent action of the digital processing system, triggers the creation of a state table in a database of the states of the information containers, said state table comprising a set of variables defining a state of the display of said information container between a state start date and a state end date.

A database is thus constructed in which each interaction with an information container comprises attributes of the interaction so as to determine objective characteristics thereof.

Advantageously a state table comprises a set of state variables of an information container, defining a state of said information container, said state variables comprising:
  an identifier of the container, and;
  an identifier of the associated information source, and;
  a state start date, and;
  an identifier of the display element on which the container is displayed, and/or;
  a position, in a frame associated with a display surface of display means, of a reference point, advantageously the center, of the information container, and/or;
  dimensions and/orientation, in the frame associated with the display surface of the display means, of the information container, and/or
  a status of the information container, and/or;
  a weight of the display of the information container in comparison with the display surface of the display means, determined as a ratio between the total display surface defined by the one or more display means and the display surface area occupied by the information container, and/or;
  a weight of the display surface of the information container visible by the operator or operators in comparison with the total display surface of said information container, and;
  an end date of this state.

These state variables of a state table, which may be supplemented if judged useful as a function of the context of the implementation of the method, precisely determine an interaction as much by its object as by its chronology and by its nature, and constitute a set of characteristics liable to be used in the interest index calculation.

In one form of implementation, the index of interest of an information source is established by a processing of the variables of the state tables, created during the work session, relating to the information containers of the information source considered, by assignment of a weight allocated to each of the variables of the state table.

It is thus possible to consult the situation relating to the interest afforded to one or more information sources at any moment in the course of a work session, without delay, the analyses being carried out while being masked during the session. The movements in the indices of interest can also be followed in real time by a specific display, for example for the exclusive use of a manager of the project.

According to one mode of implementation of the method, in which the display surface of a display means consists of a set of unitary display elements, spatial weighting parameters, recorded in a display weighting database, in which display weighting database each unitary display element of each of the display means is associated with a spatial weighting parameter, correct the weights of the variables of the state table and/or the interest index allocated to an information source.

According to one mode of implementation of the method, a display means is a screen and a unitary display element is a pixel (image element) of said screen.

Characteristics specific to the display means are taken into account in this mode so as to take account of the various display supports which do not necessarily have the same importance.

In one form of implementation of the method, a list of the interactions carried out by an operator comprises all or part of the operations of:
  pointing to an information container,
  selection of an information container,
  manipulation of the content of an information container;
  use relating to the information container of an interface element making it possible to validate the taking into account of its content;
  prolonged activity of one or more operators above or around an information container;
  enrichment and/or modification of the content of an information container by the interface means offered by the information container or any other software element.

The implementation of a list of established interactions, that may if appropriate comprise interactions other than those defined in the list hereinabove, makes it possible to facilitate the detections of interactions by employing a precise nomenclature of the interactions that it is desired to detect when they are carried out and by allocating in the nomenclature the detectable and/or measurable events which characterize them.

In one mode of implementation of the method, an information container is displayed by the display means for each of the information containers identified as not having formed the subject of any significant interaction and/or for each of the information sources identified as not having formed the subject of any significant operation. The operators are thus afforded an overview of the information not having been used and the possibility of pursuing the analysis process in a coherent manner in one and the same work session or a complementary work session.

In one mode of implementation, each interaction carried out on an information container in the course of the work session is stored by the digital processing system with a date-stamping of said interaction and with an operation type identified as resulting from said interaction or from a series of interactions, thus ensuring traceability of the interactions carried out.

In a complementary mode of implementation, each modification of the display properties of the contents is stored by the digital processing system, allowing the analysis system to more precisely identify the importances associated with the various information sources during the meeting.

Advantageously, an operation type resulting from an interaction or from a series of interactions is identified in a nomenclature stored in a memory of the digital processing system.

There is thus associated with the information sources having formed the subject of an operation data making it possible to verify a posteriori whether the operation or operations on an information source are relevant or whether they are not and justifies a reclassing of the information source with those not having formed the subject of any operation.

Advantageously the nomenclature identifies all or part of the operations of:

creation and updating of a database inventorying information sources and associated information containers;

selection of information containers of the database or which are accessible from other sources;

display of the information of one or more information containers, for example for presentation, consultation or comparison purposes;

creation of a new information container on the basis of an existing information container;

modification of a visual representation of the content of an information container;

modification of the information of an information container;

classing of information containers;

creation of attributes associated with an information source.

These operations are as needed, supplemented with others which may be general or specific to a particular problem.

For the implementation of the method, a device for aiding decision-making comprises a digital processing system, a database of information containers and of information sources, a database of the states of the information containers, a database of spatial weighting information, display means and interface means, so as to allow an operator to act on the operation of the device, these being functionally interconnected, said digital processing system comprising one or more processors, comprising data memories and program memories, and comprising means of connection to the databases, to the display means and to the interface means, said processors, memories and means of connection being connected to one or more internal communications buses so as to exchange instructions and/or data.

Furthermore, the data processing system is architectured and comprises program instruction memories so as to constitute functionally:

at least one administration unit connected to the database and in charge of the management of the information sources and of the information containers of said database and of the management of the relationships between said information sources and said information containers;

at least one displays management unit connected to the display means so as to display information containers and the results of operator interactions on said information containers;

at least one interactions interpretation unit connected to the interface means so as to interpret the interactions carried out by operators with said interface means as actions on the information containers and as operations on the information sources;

at least one unit for interpreting the evolution of the displays of the information containers, taking into account the database of spatial weighting information, so as to update in real time the database of the states of the information containers;

at least one operations processing unit organized so as to identify the information sources, of the database, having formed the subject of at least one operation, and to identify the information sources, of said database, not having formed the subject of any significant operation over a predefined period, doing so by means of the interactions interpretation information and the evolution information for the states of the information containers;

at least one summarizing unit generating information containers corresponding to the information sources not having formed the subject of any significant operation over a predefined period and/or being associated with an interest index below a threshold, for example a predefined defined threshold or a threshold defined by an operator.

There is thus made available to one or more operators a device which carries out a presentation of the information in the form of displayed containers on which the operators can work and which records in real time the interactions on the information containers and the states of the information containers and interprets same so as to identify the information sources not used.

In one aspect for the needs of certain modes of implementation of the method, the device comprises a database of the states of the information containers, which base comprises state tables, each state table containing variables defining a display over a given duration of an information container.

According to one aspect, a display surface of a display means consists of a set of unitary display elements and the device comprises a display weighting database, which base comprises for each unitary display element of the display means a spatial weighting parameter of said unitary display element.

In one aspect, the operations processing unit associates with each of the information sources a number of operations which are defined as representative of a utilization of the item of information and are performed on the information containers over a predefined period.

In an alternative aspect, the operations processing unit associates with each information container a set of states associated with its visual representation making it possible to judge the evolution of the importance associated with this information container, and therefore with the source with which it is affiliated, and thus to determine probabilities of use thereof over a predefined period.

In a more advanced aspect, the interpretation of the evolution of the state of a container is weighted by heterogeneous weights associated with the various regions of the at least one display device, which make it possible to associate all the more importance with containers displayed at positions considered to be more central than others.

In an improved aspect, the operations processing unit has the capability to process in a combined manner the interaction information on the containers and the display information of the containers so as to identify with all the more certainty the unutilized and/or the least utilized information thereof.

To allow an isolated operator to participate in a work session with the same possibilities as those afforded by the device, advantageously, the data processing system comprises at least one communication unit configured to allow the connection of a computer in the guise of display terminal of the device and/or in the guise of interface means of the device.

To allow remote operators or groups of operators to work collaboratively, advantageously, the data processing system comprises at least one communication unit configured to allow the connection of at least one remote device compliant with the device so that the at least two devices operate in mirror mode and that the interactions and/or displays and/or operations identified on a device, which is local or remote, are interpreted in the other connected device or devices and that the various utilization information items and the interest indices are consolidated.

BRIEF DESCRIPTION OF THE DRAWINGS

The description of the disclosed embodiment is given with reference to the figures which represent in a schematic manner and in a nonlimiting manner.

DETAILED DESCRIPTION OF THE DRAWINGS

Figure 1:
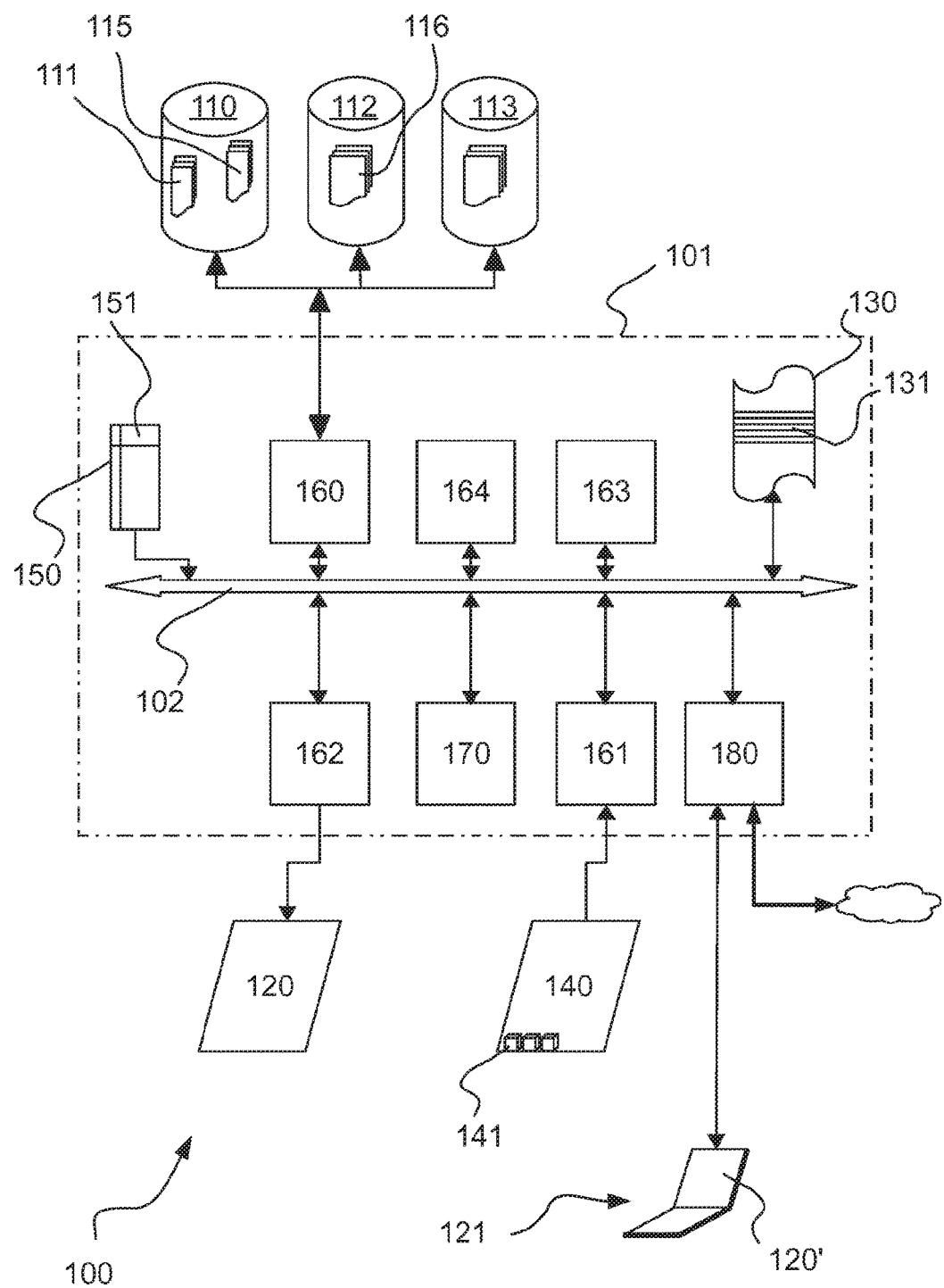
FIG. 1 is a representation of an exemplary device for aiding decision-making during the consultation of a set of information items by at least one operator.

The method of the disclosed embodiment is aimed at identifying from among a set of digital information items, assumed to be useful to an analysis in the context of decision making, that information which has not been utilized and/or which would have been the least utilized in the course of a meeting in which one or more operators are furnished with means for viewing, for interacting, and for sharing information within the framework of collaborative work, with visual representations of this information.

In the subsequent description the expression "information container" will be used to designate in a generic manner any form of presentation of information to an operator. An information container corresponds for example to a graphical surface, a screen portion, a set of pixels etc. in which is displayed a visual representation of an item of digital information and a set of optional decorations and graphical elements delimiting the region occupied by the item of information and inside which set of decorations and graphical elements the visual representation of the item of digital information is often displayed.

An information container may thus be, for example, a window such as used in operating systems of WIMP (Windows, Icons, Menus, Pointing device) type, making it possible to display a text document amid a certain number of functions accessible through buttons and/or menus, an image displayed in full screen without any decoration, a generic icon associated with a file name, an item of information displayed amid other information and associated with specific interface elements on a touch-sensitive tablet, it being possible to select a miniature so as to more precisely access an item of information etc.

On any display screen, a suitable information container is thus created to contain the visual representation of an item of information as a function of its type: image, video, text document, array, 3D, Internet page etc. or else any possible combination of types.

The expression "information source" will be used to designate the origin of any item of digital information able to be accessed and then interpreted, for example by incorporation of computer codes, to offer the user a visual representation thereof, via an information container such as described hereinabove in a generic manner.

Nonlimitingly, an information source can thus be a file which is local or remote in regard to a device on which one or more operators are operating, a text file, a file of alphanumeric values structured as an array, a database, a CAD file of 2D or 3D shapes, a url, an IP address of a computer system making available one or more specific services such as video sharing of the content displayed through its screen.

In practice, for example in a work session during which information of diverse information sources and/or of diverse types is at the disposal of people or operators participating in the work session, each operator may be led to intervene on information by performing interactions on the information container or containers associated with said information.

For example an operator may consult a content of an information container, for example incorporating the visual representation of a document, may submit it to another operator, may supplement the document with an enrichment of its content or with complementary information.

For example, an operator may also use tools of the device with which they can enlarge or decrease the apparent dimensions of a viewed information container, so as to increase or to decrease the visual area occupied by the content associated with said information container, to displace an information container so as to display it in such a way as to favor the viewing of its content by a person or an operator, to update the visual representation of the item of information by changing page on a textual item of information or viewpoint on a 3D item of information, or else to duplicate an information container so as to carry out one or more specific viewings of the content intended for other people or other operators.

In all cases, to perform these operations, the operator implements means at their disposal, in particular, within the context of the disclosed embodiment, computer means for sharing, storage, interaction and display together with information containers, that can advantageously be adapted to the context of collaborative work if several operators are involved. An exemplary architecture of such computer means will be described subsequently within the framework of a device of the disclosed embodiment.

The operations that may be carried out by one or more operators are for example:

the creation and the updating of a database inventorying information sources and associated information containers;

the selection of information containers of the database or which are accessible from other sources;

the display of the information of one or more information containers, for example for presentation, consultation or comparison purposes;

the modification of a visual representation of the content of an information container, for example the orientation of an object viewed in three dimensions in a virtual space;

the modification of the information of an information container, for example for correction purposes or for enrichment purposes;

the creation of a new information container on the basis of an existing information container, for example by selection, for example by enrichment;

the classing of information containers;

the creation of attributes associated with an information source, for example a relevance code, for example an item of information regarding attachment to other information items etc.

It must be noted that this list is not exhaustive but gives examples of types of operations that may be associated with a container and/or an information source, and that these operations can be characterized independently of the containers and/or information sources themselves and of an importance which could be allocated to them by one or more operators.

Figure 2:
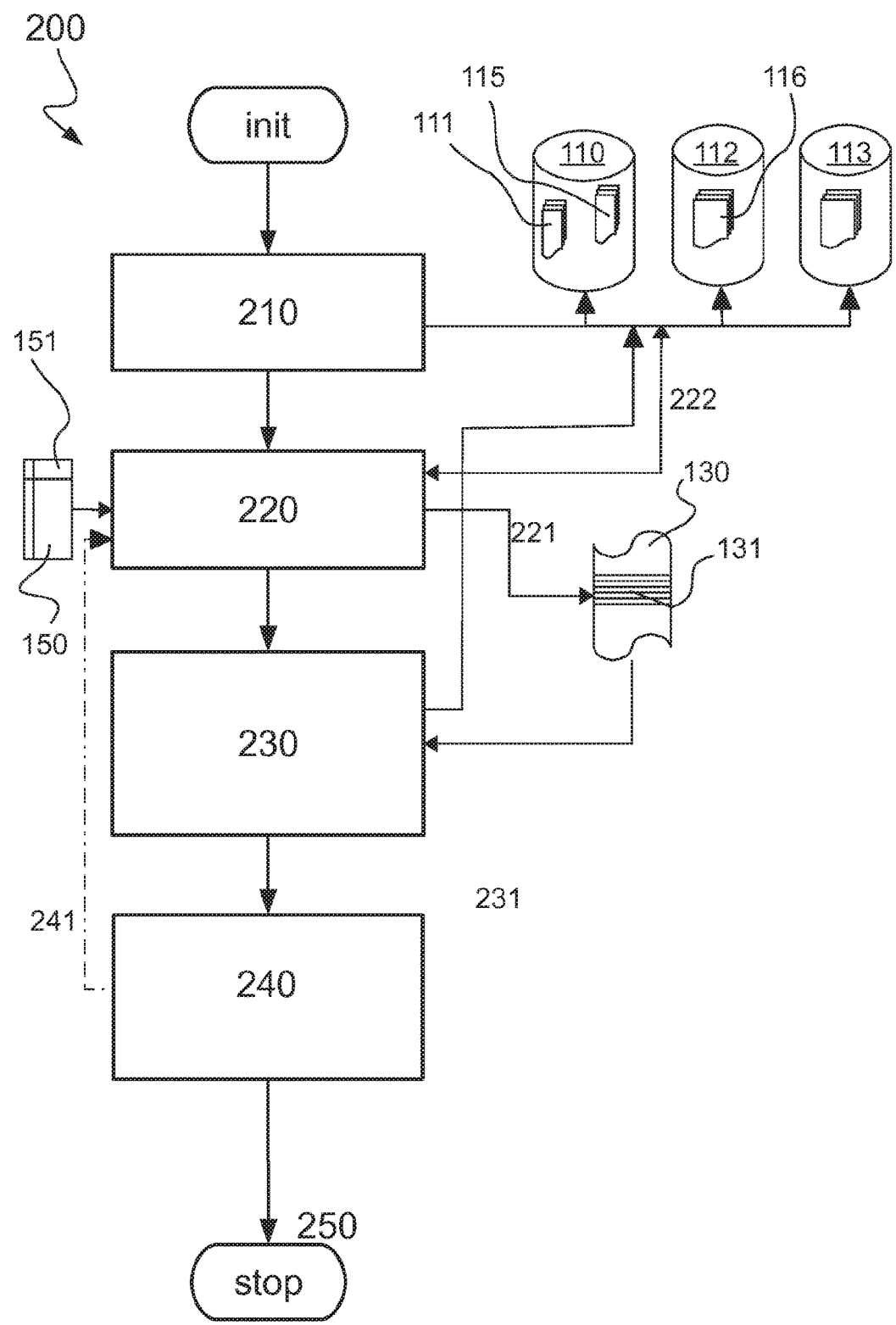
FIG. 2 is a simplified schematic of the method for aiding decision-making in the context of work on information containers.

According to the method of the disclosed embodiment, presented in the schematic diagram of FIG. 2, a subset of the information sources consisting of the information sources which have not yet been utilized and/or have been the least utilized in the course of the meeting is identified and presented to one or more operators, automatically or at their request, by processing of the interactions of the operator or operators on the information containers and/or of the evolution of the displays of the information containers.

According to the method, in a first step, a digital processing system 101 is initialized 210:
1—by the creation of a database 110 in which are stored the information sources 115 on the basis of which are generated by the digital processing system information containers 111, at least one information container per information source, also stored in the database 110 in relation with the information sources from which same originates;
2—by the creation of a database 112 of the states of the information containers, and;
3—subsidiarily by the creation of a database 113 of spatial weighting information.

The digital processing system 101 is also adapted so as, at the request of an operator, or by a call of a software package or of a software component, to display the various information containers 111 associated with the information sources of said database 110.

Thus in a work session during which provision is made to be able to consult the information, the set of information containers is accessible and an operator, advantageously each of the operators, participating in the work session can display an information container by way of the digital processing system 101.

It is noted at this juncture of the method that several operators can be grouped together around display means 120 of the digital processing system, which display means are then shared, or that some operators may be remote from the digital processing system 101 while being furnished with dedicated display means 120', for example a computer 121, which are functionally connected to the digital processing system, for example via a private network or via a public network.

With each information source of the database 110 is associated in said database a journal file containing information indicating, during the initialization step, that the information source has not yet been utilized.

With each information container of the database 110 is associated at least one state table 116 in the database of the states of the information containers 112, each of said state tables comprising a state variable set defining a state of said information container, said state variables comprising:
1. an identifier of the container, and;
2. an identifier of the associated information source, and;
3. a state start date, and;
4. an identifier of the display element on which the container is displayed, and/or;
5. a position, in a frame associated with a display surface of display means, of a reference point, advantageously the center, of the information container, and/or;
6. dimensions and/orientation, in the frame associated with the display surface of the display means, of the information container, and/or;
7. a status of the information container, and/or;
8. a weight of the display of the information container in comparison with the display surface of the display means, for example a percentage of the display surface used by the information container, determined as the ratio between the total display surface defined by the one or more display means and the surface area occupied by the information container, and/or;
9. a weight of the display surface of the information container visible by the operator or operators in comparison with the total display surface of said information container, for example determined as a ratio between the total surface area occupied by said information container minus all the parts not visible by the user, i.e. the parts hidden by other information containers and/or elements of interfaces, and the total surface area occupied by said information container, and;
10. an end date of this state.

In one aspect of the method, the status of the information container can vary between "icon", designating an information container used exclusively as interface element, or "interactive", designating an information container making it possible to explore the associated content of the information source.

Advantageously, as will emerge from further reading, the status of the information container makes it possible to filter the interactions and states judged or not to be representative of a visual utilization of the container.

During the initialization step, an initial state table is created in the database of the states of the information containers 112 for each of the information containers of the database 110, said initial state table exactly describing the initial state of each of these information containers, that is to say that each of the variables of the state table is fixed at a value characterizing the conditions in which the information container is displayed.

For example, in one mode of implementation of the method, no utilizable information container is open at the commencement of the meeting, and the database 112 is thus empty at the moment of initialization.

In a variant mode of implementation, an initial state table is created for each of the information containers 111 of the database 110 in which initial state table the state variables are allocated default values corresponding to an undisplayed information container, for example a display surface area with the value zero or an "undisplayed" status.

In one mode of implementation there is also created a database 113 of spatial weighting parameters.

According to this mode, with each display means 120 associated with the device for implementing the method is associated in the database 113 a set of the spatial weighting parameters of said display means. For example a display surface of a display means consists of a set of unitary display elements and, for each unitary display element of each display means, a unique set of parameters associating a weighting factor with said unitary element is created.

In one mode of implementation of the method, the unitary display elements of the one or more display means are pixels, and the weighting factor is an integer between 0 and 100.

During the initialization step 210, the database 113 of the spatial weighting parameters is initialized with values associated by default with the display means.

In one mode of implementation of the method, the highest weighting factor is associated with the unitary display element situated at the center of the display surface and the weighting factors decrease with distance of the unitary display element from a center of the display surface, until attaining on the periphery of the screen a minimum value which can be defined by the user and/or can be contained between 0 and 25 for example.

In one mode of implementation of the method, several distributions of the weighting factors are predefined for the one or more display means as a function of the various uses envisaged for the associated device, and the operator or operators can identify at the start of a meeting the configuration most suitable for their use, or indeed determine a new one.

In a second step of the method, activity data representative of the operations 131 performed by the operator or operators during interactions with the information containers and/or on the contents are detected and identified 220, and stored in a register 130, by the digital processing system 101, and the database 112 of the states of the information containers is reupdated as a function of the modifications of the states of the various information containers by the operator or operators and/or the processing system.

The interactions with the information containers can be carried out by any interface means 140, existing or forthcoming, to interact with the digital processing system. Such interface means are, in a manner known in the computing field, for example control keyboards, pointing systems such as mice or trackballs, voice command devices, and, in an advantageous form, detectors, associated with the display means 120, of the position of the fingers of the operator or operators on screens of said display means.

Advantageously, these interface means also include detectors, associated with the display means 120, of the proximity of a finger with the screens of said display means, thus making it possible to sense gestures made above the display surface and relating to information containers. Advantageously, detectors are designed to identify the operator responsible for a given interaction.

A content and/or the associated information container can thus be accessed by selection of an initial information container for display, manipulation of the information container to modify its proportions, displacement of the information container etc.

A content can be modified by the superposition of an item of information, selecting an item of information, annotations, affixing numerical buffers or tags etc.

In one mode of implementation of the method, the interactions on an information container 111, possibly affecting the content of said information container, are detected and the digital processing system 101 records, in the journal file for the corresponding information source, that said information container has formed the subject of an interaction.

Advantageously each interaction is dated so that the number of interactions in the course of a given time period and if appropriate a chronology of the interactions can be reconstructed.

In one form of implementation, the interactions carried out by the operator or operators are in a nonlimiting manner, for example the operations of:

Pointing to an information container,
Selection of an information container,
Manipulation of the content of the information container;
Use relating to the information container of an interface element making it possible to validate the taking into account of its content;
Prolonged activity of one or more operators above or around the information container;
Enrichment and/or modification of the content of the information container by the interface means offered by the information container or any other software element etc.

In one form of implementation, at least for certain interactions, the recording of an interaction comprises an identification of the operation, resulting from an interaction or from a sequence of interactions, from among a nomenclature 150 of predefined operations 151. In this case the identification of an operation is carried out by the digital processing system 101, preferably automatically by said digital processing system. This identification is then performed during the period in which the operation is carried out according to conventional methods to characterize events corresponding to commands normally interpreted by the operating systems of the computer devices.

In one aspect, the interface means 140 comprise means for selecting operations 141 which are at the disposal of the operator or operators so as to allow them to interact with an information container so that they themselves can assess an operation which must be recorded.

In a general manner, as will be understood from the subsequent description of the exemplary implementation of the method 200 of the disclosed embodiment, at least all the types of operations considered as possibly conveying interest, or disinterest, by one or more operators in relation to an item of information will, insofar as possible, be introduced into the nomenclature 150 of the predefined operations 151.

In one mode of implementation, the identification of an operation resulting from an interaction, or from a sequence of interactions, is taken into account to mark out an intentional interaction from among a set of interactions some of which may be accidental and be sources of errors in the interpretation which will have to be made of the interactions.

In an improved mode of implementation of the method, the journal information is weighted by characteristics of the interactions carried out on said information container, such as the amplitude of the interaction and/or the duration of the interaction.

In one mode of implementation of the method, the nomenclature 150 comprises all or part of the operations of:

Manipulation of the visual representation of a content of an information container;
Duplication of an information container;
Enrichment of an information container;
Editing of the content of an information container;
Manual creation of links between information containers;
Dispatching of an information container to another display surface, which is local or remote.

Moreover, each of the operations carried out by one or more operators, or indeed certain manual or automatic functionalities that could be offered or supported by the interface elements of the processing system, will have the effect of modifying the spatial organization of the information containers. Any modification of this organization affects the respective visibilities, positions, orientations and scales of the various information containers, and entails an updating of the database 112 of the states of the information containers In one mode of implementation of the method, as soon as an operation having altered the visual representation of an information container is detected, the set of following steps is carried out by the digital processing system 101:

1. Identification of the information container having been the object of a manipulation;

2. Finalization of the previous entry associated with said information container operated, by recording the end time of the previous state in the associated table of states in the database 112 of the states of the information containers;

3. Creation of a new entry associated with the information container operated in the database 112 of the states of the information containers in which are recorded the new state variables of said information container having been the object of an operation;

4. For each information container whose former or new properties of the information container operated alter the visibility:

Finalization of the previous entry associated with said information container whose visibility was or is altered, by recording the end time of the previous state in the associated tables of states in the database 112 of the states of the information containers;

Creation of a new entry associated with said information container whose visibility was or is altered in the database 112 of the states of the information containers in which are recorded the new state variables of said information container whose visibility was or is altered.

Moreover, in one mode of implementation, the database of the spatial weighting information 113 may optionally be reupdated as a function of an evolution of the state of the processing system and/or of operations carried out by the operator or operators.

In a third step of the method, the interactions detected, the operations identified and the state variables of the information containers are processed 230 by an operations processing unit 163 of the digital processing system 101 so as to update the database 110 by recording therein 231:

For each container associated with the interactions detected and states recorded, the actual utilization of this container, a consequence of this new utilization by a new operator;

For each information source associated with one of these information containers associated with the operations identified, the actual utilization of this source, subsequent to this new utilization by a new operator of a container associated with this source.

Considering each of the states of each of the information containers, the optional spatial weightings, each interaction carried out by an operator on one or more information containers and the operations identified on the corresponding information sources, the digital processing system 101 identifies the information sources utilized associated with the operations carried out on said information sources.

The processing unit updates the journal files on the basis of an importance of the use of each information container, in particular by applying thresholds and logical rules of characterization, and by consideration of the absolute viewing information (size, orientation, visibility of the container, state), viewing information relating to the screen (position, size, spatial weighting information) and interaction information (number and amplitude of the significant operations carried out on the information container).

Each information source 115 is thus assigned an index of interest dependent on the interactions recorded during the work session with the information containers of said information source.

In one mode of implementation, the index of interest of an information source is established by processing the contents of the set of state tables 116, created during the work session, relating to the information containers of the information source considered.

In one mode of implementation, the spatial weighting information of the database 113 is taken into consideration to correct the weight of an information container in an index of interest.

When the index of interest of an information source is below a predefined threshold, it is declared that the corresponding information containers have not been the object of any significant interaction.

By way of example of situations that may lead to such a result of the index of interest can be cited the case of an information container which has been displayed only in the form of a miniature icon, or else a container which has been displayed only for a short duration for example less than ten seconds.

In one mode of implementation of the method, in addition to the elements of the nomenclature 150, a combination of logical rules and appropriate threshold conditions makes it possible to identify the following events, representing in this mode of implementation a high importance associated by the operator or operators with the information container concerned:

Display of an information container with a visibility of more than 80% and a size of 25% of the display area offered by the associated display means for more than two minutes;

Display of an information container with a size exceeding 50% of the display area offered by the associated display means for more than 30 seconds;

Display of an information container with a visibility of 100% at the center of the screen for more than 30 seconds;

Display of an information container with a visibility of 50% for more than 5 minutes at a position on the display surface of a weighting greater than the median weighting value etc.

The values indicated hereinabove of visibility and/or of sizes and/or of duration are given by way of example and can be increased or decreased as a function of the importance allocated to each criterion and of their noted effects on the results obtained by the method, which may be influenced in particular by the performance of the display means of the device implemented.

Advantageously, if the interaction means 140 make it possible to identify the operator that carried out an operation, this item of information is recorded in the corresponding journal file in the database 110.

Although described here in the context of an a posteriori processing, the processing of the identified operations can be carried out in a recurrent manner at intervals of time or of greater or smaller number of operations, or indeed after each new identified operation for utilization in "real time".

In a fourth step of the method, data recorded in the journal files during the work session on the information containers 111 and the information sources 115 of the database 110 are interpreted 240 in order to be utilized by the operator.

In one aspect, after use in the course of a meeting by the operator of an interface element which is physical or digital, associated with the viewing device, the digital processing system 101 identifies in the database 110 which of these information sources have not yet been utilized and/or have been the least utilized and presents this set to at least one operator. Advantageously, the information sources which have not yet been utilized and/or have been the least utilized are those whose journal files in the database 110 are still in their initial state or close to this state, that is to say that no or few interactions with an information container incorporating a representation of such an information source has been recorded and/or that this information source has never or hardly been displayed by an information container exhibiting characteristics of geometry and/or of visibility and/or of position that are judged to reveal a utilization of its content by at least one operator, and consequently no utilization of the information source has been identified.

For example each of the information sources from among those not utilized and/or those least utilized is represented by a new information container, which information containers are displayed on a viewing device.

In an improved aspect, the operator or operators may have at their disposal a set of interface elements allowing them to adjust thresholds associated with the journal files and making it possible to dynamically refine the importance associated with the journal values, for finer identification of the information sources which have or have not been utilized and/or for identification of the most or the least utilized information containers and/or sources.

Advantageously, in one form of implementation, the method is resumed at the second step and the interface means 140 are used to interact with information containers of this new set of information containers displayed by the device, and all or part of the interactions, for example corresponding to operations defined in the nomenclature 150, are detected for these new containers.

The implementation of the method 200 is terminated 250 with the end of a work session, which may for example be proclaimed by one or more operators when all the information sources and/or containers have each formed the subject of at least one utilization or when on completion of the fourth step information sources are still identified as unutilized and have not formed the subject of an interaction with an associated information container.

The steps of the method 200 can be carried out automatically throughout the work session.

Advantageously, the database 110 is updated in the course of a meeting (creation of a new information source on the basis of an existing information source, creation of a new container by duplicating an existing container, etc.).

Advantageously, the data corresponding to a work session are archived by the system 101, in particular the database 110 so as to ensure traceability of the work carried out and if appropriate to reinitialize the system 101 and subsequently resume an interrupted work session.

Advantageously, the various utilization criteria can also be analyzed and interpreted separately.

FIG. 1 represents an example of a device 100 for identifying the use of information sources which is suitable for the implementation of the method of the disclosed embodiment.

The device 100 is a tool for aiding thought, intended for the implementation of the method 200 of the disclosed embodiment.

The device 100 comprises a digital processing system 101, means for storing data, display means 120 and interface means 140 for acting on the operation of the digital processing system.

The digital processing system comprises:

at least one administration unit 160 for a database 110, said administration unit being configured to manage the content of said database, in particular the loading, the updates and the accesses to information sources 115 and/or information containers 111 of said database;

at least one management unit 161 for the interactions, of one or more operators, with information containers by way of the interface means 140;

an operations processing unit 163, which said operations processing unit interprets the interactions so as to identify the characteristics representative of a utilization of an information container by one or more operators, among which: the changes of visibility, of geometry and/or of position of said information container, and/or the execution of operations on the information containers 111, said operations advantageously being identified in a nomenclature 150 of predefined operations 151 which are stored in a memory of the device 100;

at least one display management unit 162 carrying out, in addition to the conventional display functions of the information containers 111, the displays necessary for managing the interactions carried out on the information containers, in particular the virtual buttons for selecting and validating the operations, at least when the identification of operations requires an operator interaction;

at least one summarizing unit 164 producing one or more representations of results obtained by the method, said summarizing unit comprising means for interpreting the interactions of at least one operator so as to parametrize the representations and to conduct an exploration of said representations.

In one aspect, the device 100 comprises at least one action unit 170 for acting on the information containers so as to carry out as a function of orders received by commands of at least one operator and/or by instructions of the device the reading, the display, the modification and the recording of each type of information container.

Such an action unit 170 corresponds to ordinary processing means of a computer system furnished with programs necessary for each type of information container and, according to the information container, software packages of the text processing type, of the spreadsheet type, of the image and video processing type, of the CAD type etc.

In one aspect, the action unit 170 corresponds to an exterior resource exchanging the digital information necessary for the operation of the device via a network such as an Ethernet network.

As illustrated by way of example in FIG. 1, the device exhibits for example a digital calculator architecture comprising one or more processors in which the functional units, and the various necessary memories, are arranged around one or more digital communication buses 102 and which is functionally connected, at least, to the display means 120 and to the interface means 140.

The display means 120 are architectured around at least one viewing device having the capabilities of displaying via information containers the various types of information of the information sources liable to be entered into the database 110. Advantageously the display means 120 are also furnished with capabilities for processing audio information sources so as to reproduce the sounds, possibly associated with other types of files, for example information sources characterizing muscular sensations through force restitution systems.

In an advantageous aspect, at least one viewing device is a viewing screen with dimensions and resolution sufficient to display a plurality of contents with sufficient quality to allow reading or analysis thereof by one or more operators simultaneously and to allow these same operators to interact, as far as possible simultaneously, on the contents or on the information containers viewed.

The interface means 140 consist of any known means for inputting data and for manipulating digital files and/or their contents. In an advantageous embodiment, the interface means 140 are integrated into at least one viewing device of the display means, for example in the form of a touchscreen.

Such a touchscreen can be placed in a plane which is substantially horizontal, so as to favor collaboration between the users, in a plane which is substantially vertical, so as to favor the reading and the sharing of information, or at any other orientation liable to favor specific cases of use.

With such an interface architecture, the operator or operators can interact directly with the digital information displayed by placing their fingers directly on the containers of this information, for example so as to manipulate said displayed digital information (active interaction) or to attract the attention of the other operators to certain parts of a given item of digital information or to relationships existing between several of these items of digital information (passive interaction).

Advantageously, gestures carried out by an operator on the touch-sensitive surface of a screen with the sole aim of attracting the attention of the other participants will be recorded by the device 100 as interactions as well as their interpretations in the guise of operations 131 on the information sources according to the nomenclature 150 in an analysis carried out by the operations processing unit, this being so even if a software function has been used to block the modifications of display corresponding to the interpretation of the touch events.

In an alternative aspect, the display means 120 comprise two or more touchscreens so that one or more operators or various groups of operators each have the possibility of viewing and of interacting with the information containers displayed while continuing to share the interactions and the operations on account of a display which is common to the screens.

In an alternative aspect, computer terminals assigned wholly or in part to one or more operators are hooked up via a digital network to the device 100 so as to exchange and/or transmit, at the start or in the course of a work session, information sources and/or information containers to the database 110.

Advantageously, in an improved aspect of the method, the nomenclature of operations 150 comprises all the operations carried out by the operator of a computer terminal, on their terminal with the input device associated with their terminal hooked up to the device 100, when the content is displayed, on their terminal, inside an information container exhibiting geometry, position and visibility characteristics above the pre-indicated thresholds.

In an alternative aspect, at least two touchscreens are integrated into the device, at least one of which is a horizontal touchscreen assigned to interactive exchanges between the operator or operators and at least one of which is a vertical touchscreen assigned to the viewing of critical information.

In one aspect, the device 100 comprises means of connection to a communication network by a communication unit 180 carrying out a synchronization of two or more devices compliant with the device of the disclosed embodiment.

In one aspect, several devices 100 are hooked up via a digital network so as to exchange and/or transmit, at the start or in the course of a work session, information sources and/or information containers between the databases 110. Advantageously, according to the reciprocal settings of the devices, the utilization information of their respective databases 110 may or may not be synchronized.

The communication unit 180 carries out the synchronization of two devices 100, that may be situated in remote places, by ensuring:
 similar if not identical initialization of each of the devices;
 real-time copying over of the bases of information containers 110, during initialization and also as a function of the modifications made to said bases during the work sessions;
 real-time transmission of data allowing each of the devices to reconstruct all or part of the displays and of their modifications on the display means 120.

Here, real-time should be understood as meaning that the copyovers of all or part of the displays and/or interactions of a device by another are carried out without latencies other than those imposed by the capabilities of the communication means which preferably are dimensioned and use communication protocols allowing at least one remote operator to work in a quasi-simultaneous manner so that the various devices operate in mirror mode.

Remote operators or groups of operators are thus enabled to work collaboratively by utilizing the same information presented in the same manner and subjected to the same interactions simultaneously.

Advantageously, the bases of information sources and of their values of utilization of two devices connected by network connection means can be compared with one another, with the objective of allowing one group of operators to validate the taking into account of an item of information which would have been transmitted to the other group.

The device of the disclosed embodiment allows one or more users, at any instant of a work session for which they will have used the database updating means and the interaction and display means placed at their disposal, to determine objectively, at their request or automatically, via at least one viewing interface, which of the information sources of the base have not yet been utilized and/or have been the least utilized in the thought, and this will have been determined as a function of the interactions carried out previously on subsets of the information containers associated with these digital information sources.

What is claimed is:

1. A method for aiding decision-making in which a plurality of information sources, presupposed to be useful to the analysis of a situation having to form the subject of at least one decision, are referenced in a database of a device for aiding decision making, the device for aiding decision making comprising a digital processing system, the database which stores information containers and information sources, a display means and interface means, by which device at least one operator carries out, in the course of a work session, through the interface means interactions on information containers presented to said at least one operator in visual form by the display means, the method comprising: detecting, with the interface means, any interaction of an operator with an information container and storing, the interactions in a memory of the digital processing system; interpreting, with at least one interactions interpretation unit of the digital processing system, said stored interactions so as to determine an index of interest of each of the information sources from which said information containers originate; identifying, with at least one operations processing unit of the digital system, information sources of the database, having formed the subject of at least one operation and identifying the information sources, of the database, not having formed the subject of any significant operation over a predefined period; establishing, with at least one summarizing unit of the digital processing system, on a prompt of an operator or of the digital processing system, a list of information containers of the database organized by values, or tranches of values, of the indices of value determined for each of the information sources in the course of the work session.

2. The method as claimed in claim 1, wherein the list of the information containers of the database organized by values, or tranches of values, of the indices of value determined for each of the information sources determines a list of information containers of the database whose index of interest is below a predefined threshold value and/or one defined by an operator, said threshold value being chosen as criterion to specify that the corresponding information sources of the database have not formed the subject of any significant operation, that is to say of any significant interaction of the set of information containers of the information source considered, in the course of the work session.

3. The method as claimed in claim 2, wherein an information container is displayed by the display means for each of the information containers identified as not having formed the subject of any significant interaction and/or for each of the information sources identified as not having formed the subject of any significant operation.

4. The method as claimed in claim 3, wherein an operation type resulting from an interaction or from a series of interactions is identified in a nomenclature stored in a memory of the digital processing system.

5. The method as claimed in claim 1 wherein any modification of an information container, resulting from an interaction of an operator or an independent action of the digital processing system, triggers the creation of a state table in a database of the states of the information containers, said state table comprising a set of variables defining a state of the display of said information container between a state start date and a state end date.

6. The method as claimed in claim 5, wherein the index of interest of an information source is established by a processing of the variables of the state tables, created during the work session, relating to the information containers of the information source considered, by assignment of a weight allocated to each of the variables of the state table.

7. The method as claimed in claim 6, wherein a display surface of a display means consists of a set of unitary display elements and wherein spatial weighting parameters recorded in a display weighting database, wherein display weighting database each unitary display element of each of the display means is associated with a spatial weighting parameter of said unitary display element, correct the weights of the variables of the state table and/or the interest index allocated to an information source.

8. The method as claimed in claim 1, wherein a state table comprises a set of state variables of an information container, defining a state of said information container, said state variables comprising:
    an identifier of the container, and;
    an identifier of the associated information source, and;
    a state start date, and;
    an identifier of the display element on which the container is displayed, and/or;
    a position, in a frame associated with a display surface of display means, of a reference point, advantageously the center, of the information container, and/or;
    dimensions and orientation, in the frame associated with the display surface of the display means, of the information container, and/or a status of the information container, and/or;
    a weight of the display of the information container in comparison with the display surface of the display means, determined as a ratio between the total display surface defined by the one or more display means and the display surface area occupied by the information container, and/or;
    a weight of the display surface of the information container visible by the operator or operators in comparison with the total display surface of said information container, and;
    an end date of this state.

9. The method as claimed in claim 1, wherein a list of the interactions carried out by an operator comprises all or part of the operations of:
    pointing to an information container,
    selection of an information container,
    manipulation of the content of an information container;
    use relating to the information container of an interface element making it possible to validate the taking into account of its content;
    prolonged activity of one or more operators above or around an information container;
    enrichment and/or modification of the content of an information container by the interface means offered by the information container or any other software element.

10. The method as claimed in claim 1, in which each interaction carried out on an information container in the course of the work session is stored by the digital processing system with a date-stamping of said interaction and with an operation type identified as resulting from said interaction or from a series of interactions.

11. The method as claimed in claim 10, wherein the nomenclature identifies all or part of the operations of:
    creation and the updating of a database inventorying information sources and associated information containers;
    selection of information containers of the database or which are accessible from other sources;
    display of the information of one or more information containers, for example for presentation, consultation or comparison purposes;
    modification of a visual representation of the content of an information container;
    modification of the information of an information container;
    creation of a new information container on the basis of an existing information container;
    classing of information containers; and
    creation of attributes associated with an information source.

12. A device for aiding decision-making comprising a digital processing system, a database of information containers and of information sources, display means and interface means, to allow an operator to act on the operation of the device, these being functionally interconnected, said digital processing system comprising one or more processors, comprising data memories and program memories, and comprising means of connection to the database, to the display means and to the interface means, said processors, memories and means of connection being connected to one or more internal communications buses so as to exchange instructions and/or data, characterized in that the data processing system is architectured and comprises program instruction memories so as to constitute functionally: at least one administration unit connected to the database and in charge of the management of the information sources and of the information containers of said database and of the management of the relationships between said information sources and said information containers; at least one displays management unit connected to the display means so as to display information containers and the results of operator interactions on said information containers; at least one interactions interpretation unit connected to the interface means so as to interpret the interactions carried out by operators with said interface means as actions on the information containers and as operations on the information sources; at least one operations processing unit organized so as to identify the information sources, of the database, having formed the subject of at least one operation and to identify the information sources, of said database, not having formed the subject of any significant operation over a predefined period; at least one summarizing unit generating information containers corresponding to the information sources not having formed the subject of any significant operation over a predefined period and/or being associated with an interest index below a threshold.

13. The device as claimed in claim 12, comprising a database of the states of the information containers, which base comprises state tables, each state table containing variables defining a display over a given duration of an information container.

14. The device as claimed in claim 13, wherein a display surface of a display means consists of a set of unitary display elements and comprises a display weighting database, which base comprises for each unitary display element of each of the display means a spatial weighting parameter of said unitary display element.

15. The device as claimed in claim 12, wherein the operations processing unit associates with each of the information sources a number of operations performed on the information sources over a predefined period.

16. The device as claimed in claim 12, wherein the data processing system comprises at least one communication unit configured to allow the connection of a computer in the guise of display terminal of the device and/or in the guise of interface means of the device.

17. The device as claimed in claim 12, wherein the data processing system comprises at least one communication unit configured to allow the connection of at least one remote device compliant with the device so that the at least two devices operate in mirror mode and that the interactions and/or operations identified on a device, which is local or remote, are identified in the other connected device or devices and that the various utilization information items and the interest indices are consolidated.

\* \* \* \* \*